US011953025B2

(12) United States Patent
Arango et al.

(10) Patent No.: US 11,953,025 B2
(45) Date of Patent: Apr. 9, 2024

(54) MARINE PUMP WITH NOZZLE INTERFACE AND DETACHABLE STRAINER BASE

(71) Applicant: T-H Marine Supplies, LLC, Huntsville, AL (US)

(72) Inventors: Jonathan Arango, Ft. Myers, FL (US); Scott David Spetich, Fort Myers, FL (US); John Logan Nelson, Fort Myers, FL (US)

(73) Assignee: T-H Marine Supplies, LLC, Huntsville, TN (US)

( * ) Notice: Subject to any disclaimer, the term of this patent is extended or adjusted under 35 U.S.C. 154(b) by 0 days.

(21) Appl. No.: 18/130,681

(22) Filed: Apr. 4, 2023

(65) Prior Publication Data

US 2023/0313816 A1 Oct. 5, 2023

Related U.S. Application Data

(60) Provisional application No. 63/327,202, filed on Apr. 4, 2022.

(51) Int. Cl.

| | |
|---|---|
| ***F04D 29/70*** | (2006.01) |
| ***F04D 13/08*** | (2006.01) |
| ***F04D 29/60*** | (2006.01) |
| ***F04D 29/66*** | (2006.01) |

(52) U.S. Cl.

CPC ........... *F04D 29/708* (2013.01); *F04D 13/08* (2013.01); *F04D 29/605* (2013.01); *F04D 29/669* (2013.01); *F05D 2260/02* (2013.01)

(58) Field of Classification Search

CPC ............................... F04D 29/708; F04D 13/08

See application file for complete search history.

(56) References Cited

U.S. PATENT DOCUMENTS

| | | | | |
|---|---|---|---|---|
| 6,715,994 | B2 * | 4/2004 | Patel | F04B 39/121 417/12 |
| 7,625,187 | B2 | 12/2009 | Collins et al. | |
| 9,121,399 | B2 | 9/2015 | Bovill | |
| 2012/0024767 | A1 | 2/2012 | Bovill | |
| 2014/0210203 | A1 | 7/2014 | Lorkowsi | |
| 2021/0299685 | A1 * | 9/2021 | Pelletier | B05B 7/0475 |

OTHER PUBLICATIONS

International Search Report and Written Opinion for International Application No. PCT/US23/17478, dated Jun. 21, 2023.

* cited by examiner

*Primary Examiner* — Brian O Peters

(74) *Attorney, Agent, or Firm* — Bradley Arant Boult Cummings, LLP; Stephen H. Hall; Alex H. Huffstutter

(57) ABSTRACT

A marine pump may have a nozzle interface and a detachable strainer base. The nozzle interface may have an aperture for removably receiving a nozzle, and a detent channel defined therein. The detent channel may be configured to receive portion of a detent, which may be configured to contact the nozzle and hold the nozzle in place when inserted into the nozzle interface. The detachable strainer base may have a plurality of slots and a plurality of holes configured to interact with and stop particulates in a fluid passing through the strainer base.

19 Claims, 16 Drawing Sheets

MARINE PUMP WITH NOZZLE INTERFACE AND DETACHABLE STRAINER BASE

CROSS-REFERENCE TO RELATED APPLICATIONS

This application claims priority to U.S. Provisional Patent Application Ser. No. 63/327,202, filed Apr. 4, 2022 and entitled "Marine Pump with Nozzle Interface and Detachable Strainer Base," which is incorporated herein by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

Marine pumps are frequently installed in locations where a user may experience difficulty accessing the pump and its parts. It may be difficult to remove or install lines or other connections to the pump. In addition, it may be difficult to clean or maintain the pump. Improved techniques for providing a serviceable marine pump are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
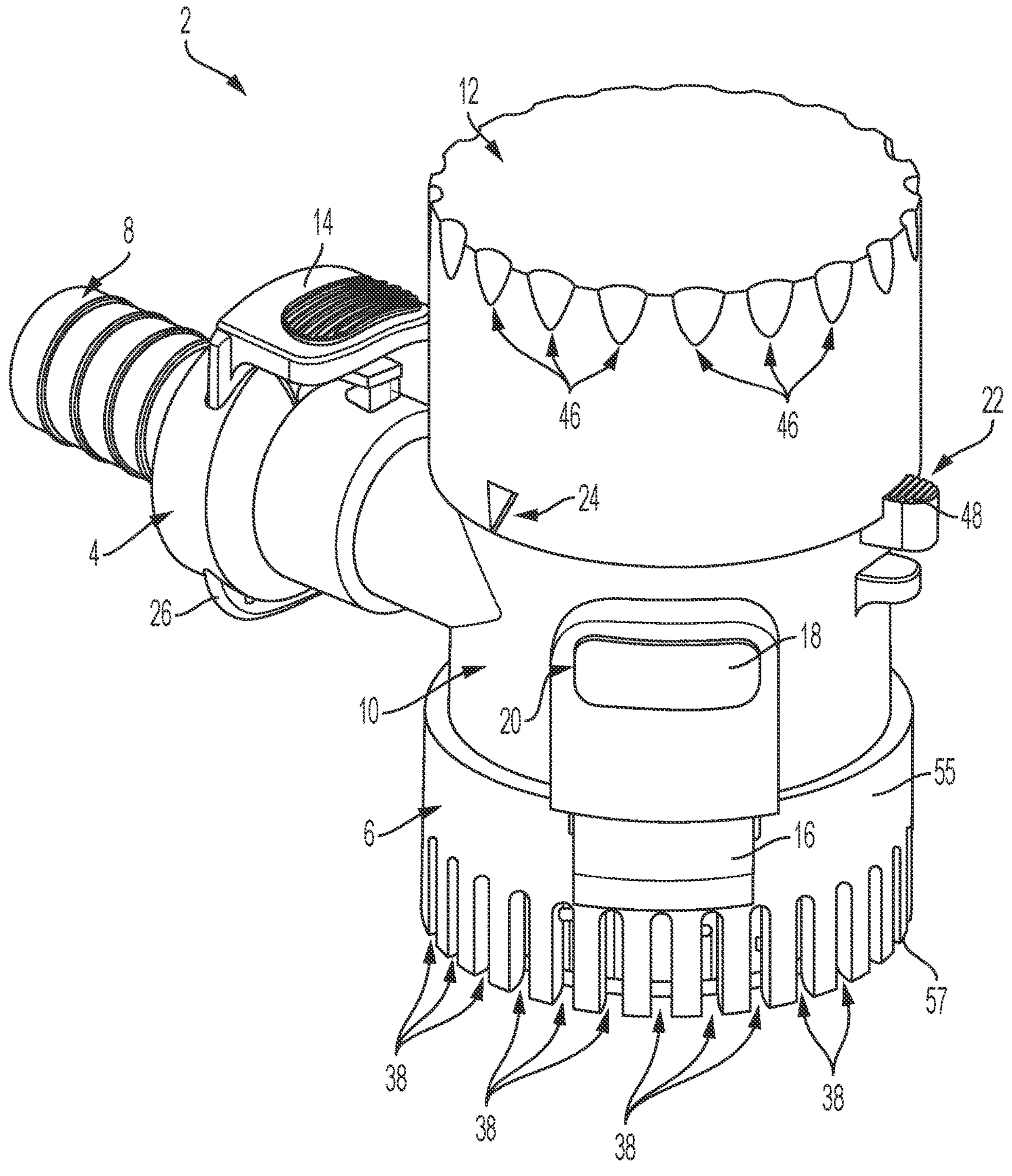
FIG. 1 is a three-dimensional view of a marine pump with nozzle interface and strainer base.
Figure 2:
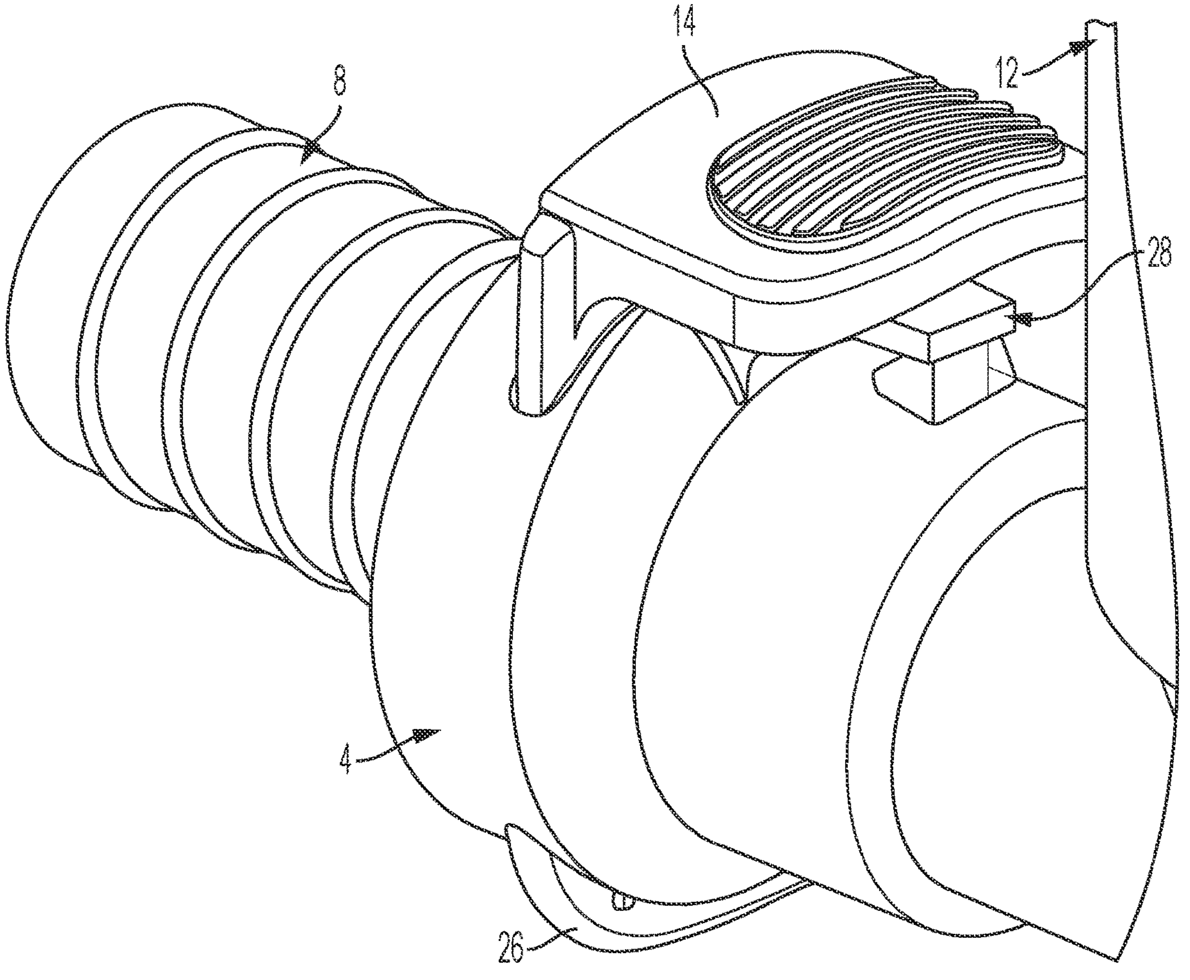
FIG. 2 is a three-dimensional view of nozzle interface of a marine pump, with nozzle inserted.
Figure 3:
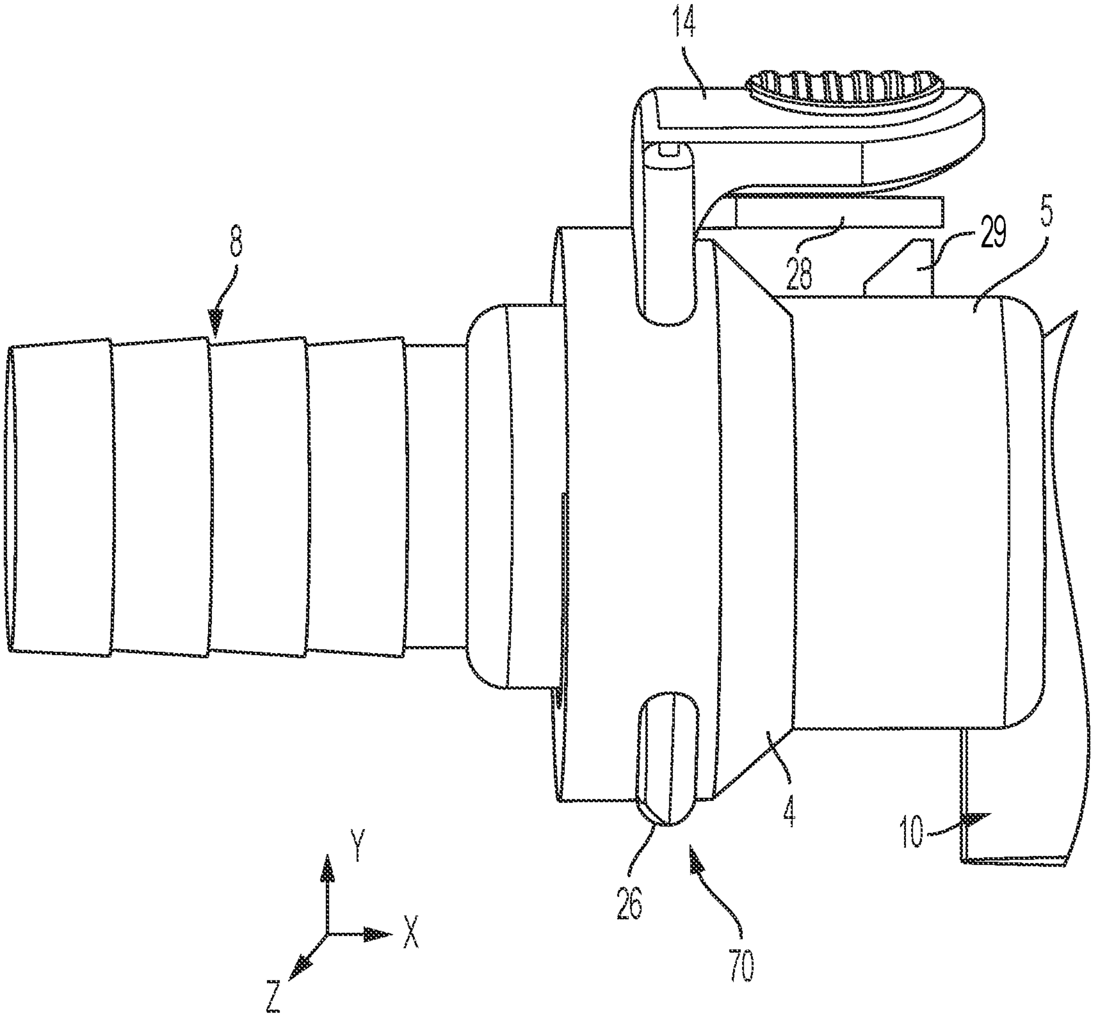
FIG. 3 is a side view of a nozzle interface of a marine pump, with nozzle inserted.

Referring to FIG. 1, an improved marine pump 2 is shown. The improved marine pump 2 may also be referred to herein as a marine pump 2. The marine pump 2 may include a nozzle interface 4 and a detachable strainer base 6. The detachable strainer base 6 may also be referred to herein as a strainer base 6. As shown in additional detail in FIGS. 4-7, the nozzle interface 4 may have a nozzle aperture 30 configured to receive a nozzle 8. The nozzle aperture 30 may also be referred to herein as a nozzle interface aperture 30 or an aperture 30. The nozzle interface 4 may further include a detent channel 32. The detent channel 32 may be positioned within a portion of the nozzle interface 4 and configured to selectively receive a portion of a detent 26. As shown and described further below, the detent 26 may be configured to contact and engage the nozzle 8 and hold the nozzle 8 in place when inserted into the nozzle aperture 30 of the nozzle interface 4. The detent 26 may move within the channel 32; when pressure in the negative Y-axis direction is applied to the actuation surface 14, the detent 26 may move within the channel in the negative Y-axis direction from a first position (e.g., engaged position 70) to a second position (e.g., release position 72) to permit insertion or removal of a nozzle 8 from the interface 4. When pressure is released, a spring tab 28 may return the detent 26 to its first position, to cause the detent 26 to engage the nozzle 8 and lock it into place within the nozzle aperture 30 of the nozzle interface 4.

The detachable strainer base 6 may include a plurality of slots 38 and a plurality of holes 40 configured to interact with and stop particulates in a fluid passing through the strainer base 6. The improved marine pump 2 may easily be serviced, repaired, and/or replaced by detaching a pump housing 10 of the improved marine pump 2 from the detachable strainer base 6 and from the nozzle 8, as will be described in further detail below.

Referring to FIGS. 2-5, an embodiment of the nozzle interface 4 is shown in greater detail. The nozzle aperture 30 may be cylindrical, or more specifically define an essentially cylindrical volume along at least a first portion of a length in the positive x-axis direction of the nozzle interface 4. In certain optional embodiments, the detent channel 32 may be open to a portion of an interior surface area of the nozzle aperture 30. In other optional embodiments, the detent channel 32 may be open between a portion of the outer surface 5 of the nozzle interface 4 and the nozzle aperture 30. In further optional embodiments, a portion of the detent 26 may extend from the outer surface 5, for example, above and/or below an underside of the nozzle interface 4.

The detent 26 may include an essentially circular aperture 27. A circumference of the circular aperture 27 may be at least as great as a circumference of the nozzle aperture 30, for example, such that the circular aperture 27 of the detent 26 does not interfere with the nozzle 8 as it is inserted into the nozzle aperture 30. As illustrated in at least FIGS. 4-5, the detent 26 may include a catch 34 configured to contact the outer surface 5 of the nozzle interface 4 when the detent 26 is in an engaged position 70.

Figure 7:
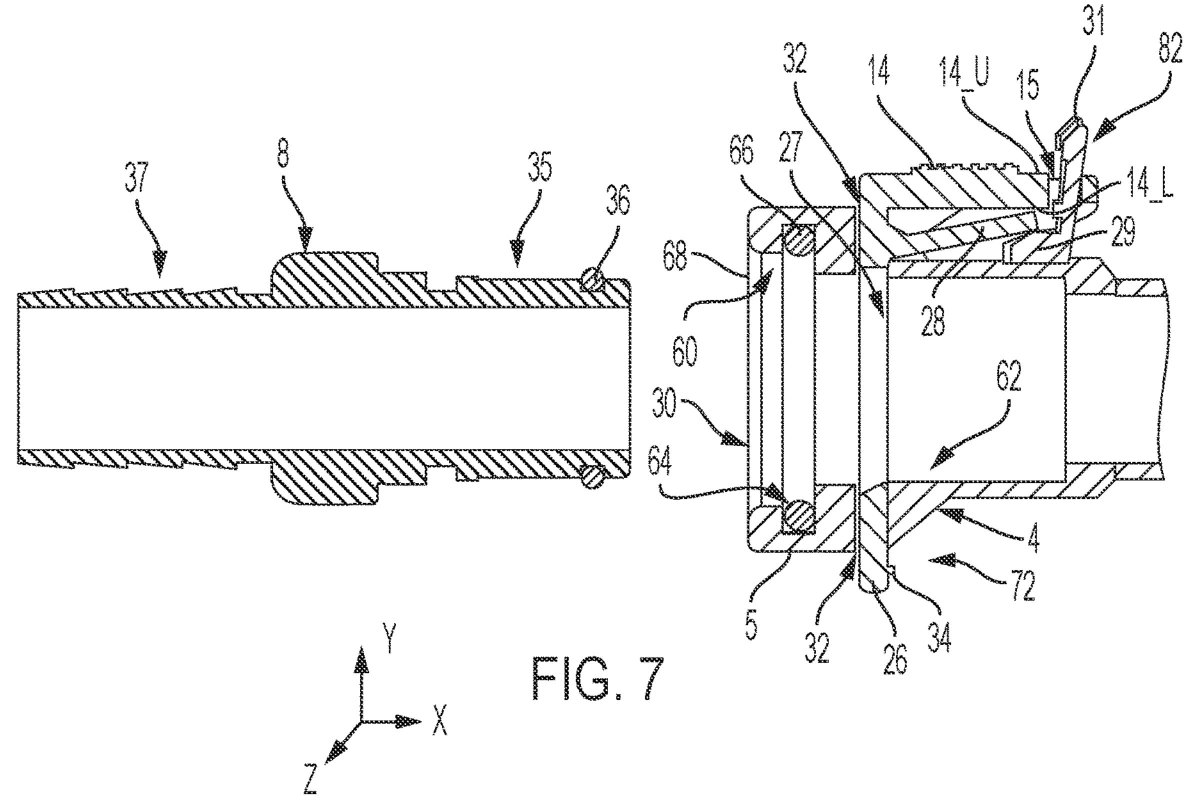
FIG. 7 is a cross-sectional side view of a nozzle interface of a marine pump with a detent locking arm in an unlocked position, a detent in a release position, and nozzle removed.

The detent 26 may include an actuation surface 14 configured to be engaged from an exterior of the nozzle interface 4. For example, the actuation surface 14 may be positioned above the outer surface 5 of the nozzle interface 4. In certain optional embodiments, the detent channel 32 may be configured to allow the circular aperture 27 of the detent 26 to move out of a surface area (e.g., a cross-sectional area) of the nozzle aperture 30 when a release pressure is applied to the actuation surface 14, defining a release position 72 (as illustrated in FIG. 7 and further discussed below). For example, a user may apply pressure in essentially apply pressure in the negative Y-axis direction to depress the detent 26 downward into the detent channel 32, thus allowing clearance for insertion or removal of the nozzle 8 from the nozzle aperture 30 of the nozzle interface 4. In other optional embodiments, the detent channel 32 may be configured to allow a portion of the detent 26 to move into the surface area of the nozzle aperture 30 when the release pressure is removed from the actuation surface 14. In further optional embodiments, the detent 26 may include a spring tab 28 positioned below the actuation surface 14. The spring tab 28 may be configured to engage a protrusion 29 extending from the outer surface 5 of the nozzle interface 4 for biasing the detent 26 towards the engaged position 70 (e.g., for biasing the detent 26 in the positive Y-axis direction). In certain optional embodiments, the protrusion 29 may be integrally formed with the nozzle interface 4. The detent 26 advantageously provides the nozzle interface 4 with an efficient and user-friendly way to quickly release the nozzle 8, while also securely locking the nozzle 8 in place when disengaged, via the spring tab 28.

Figure 4:
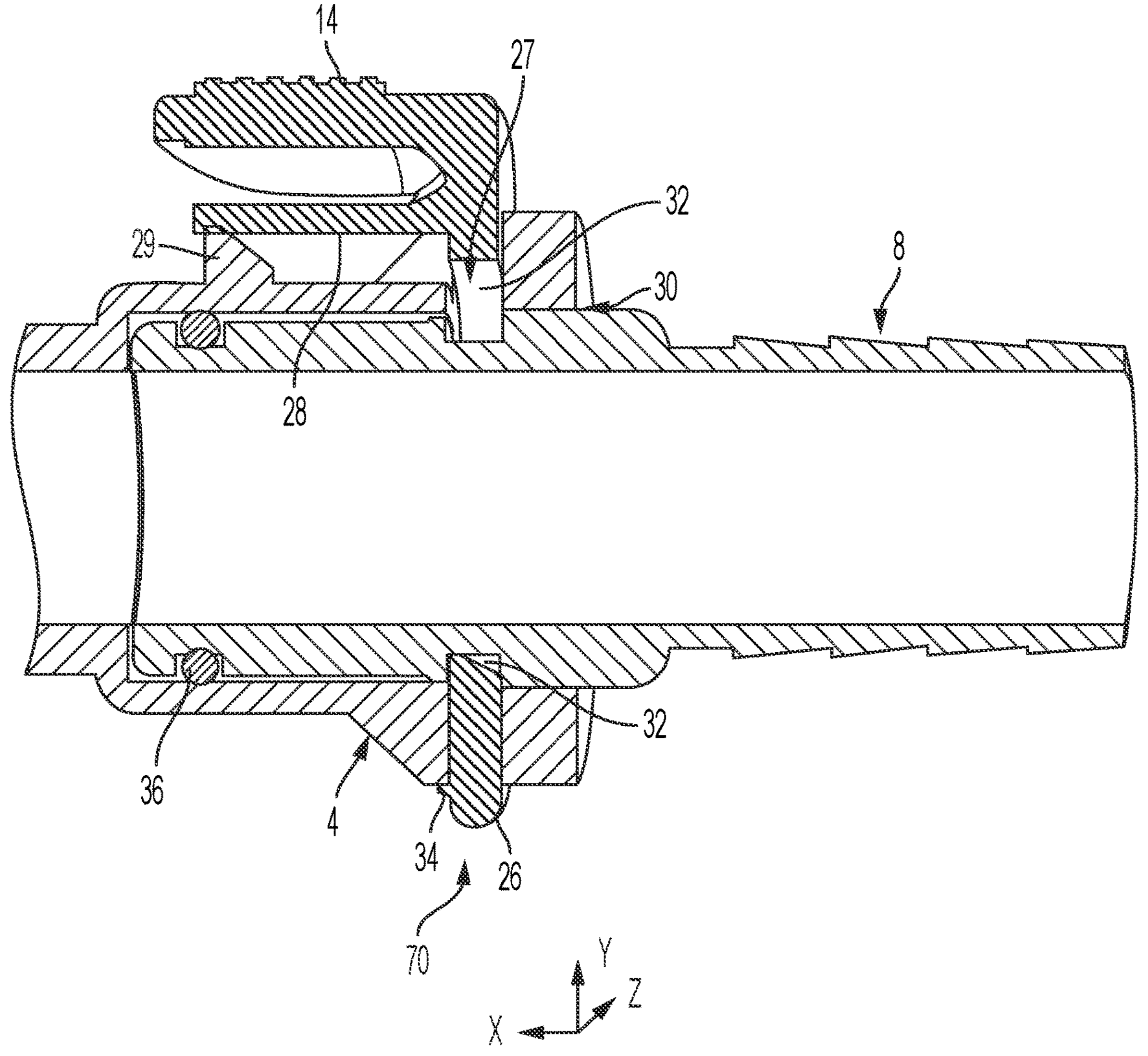
FIG. 4 is a cross-sectional side view of a nozzle interface of a marine pump taken along and in the direction of line 1-1 of FIG. 1, with nozzle inserted.

As illustrated in FIGS. 4-5, an embodiment of the nozzle 8 may include an interface portion 35 configured to be received by the nozzle aperture 30 and a barbed portion 37 opposite the interface portion 35. The barbed portion 37 may be configured to receive a hose for transferring water from the marine pump 2 to its destination. The interface portion 35 may include gasket 36 configured to create a seal between the nozzle 8 and the nozzle aperture 30. The interface portion 35 of the nozzle 8 may further include an indentation configured to receive a portion of the detent 26 when in the engaged position 70. The indentation may be circumferential so as to be easily accessible by the detent 26 regardless of a rotational orientation of the nozzle 8.

Figure 6:
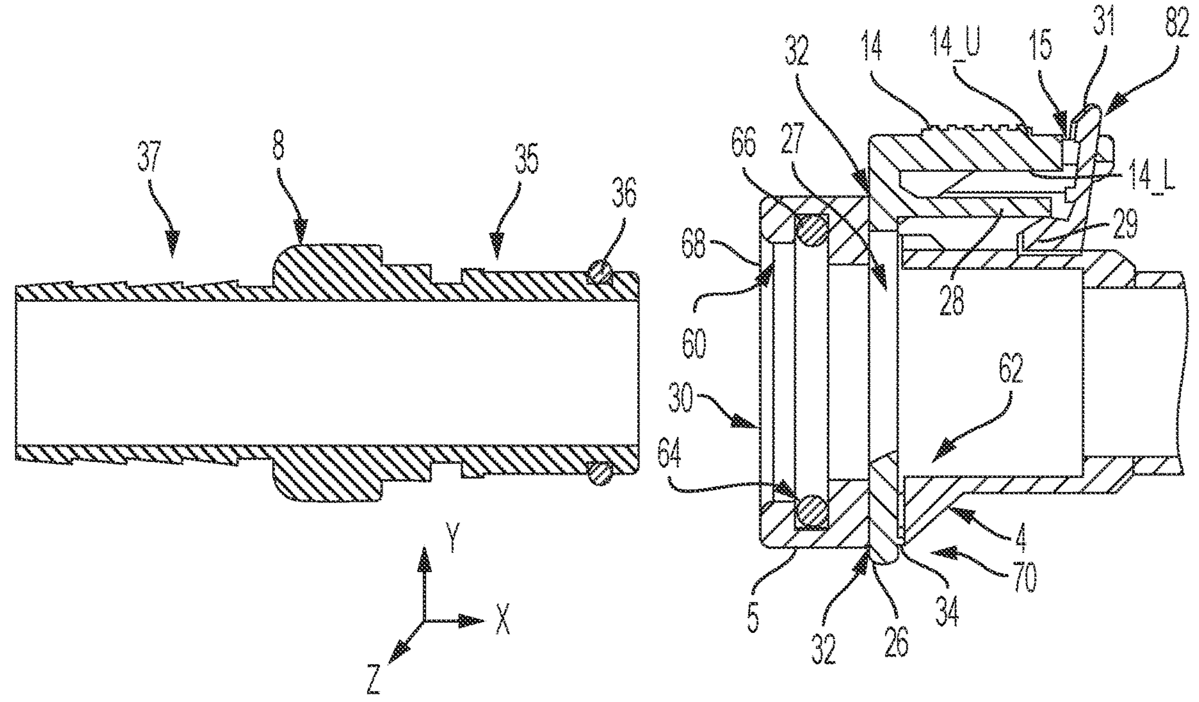
FIG. 6 is a cross-sectional side view of a nozzle interface of a marine pump with a detent locking arm in an unlocked position, a detent in an engaged position, and nozzle removed.
Figure 8:
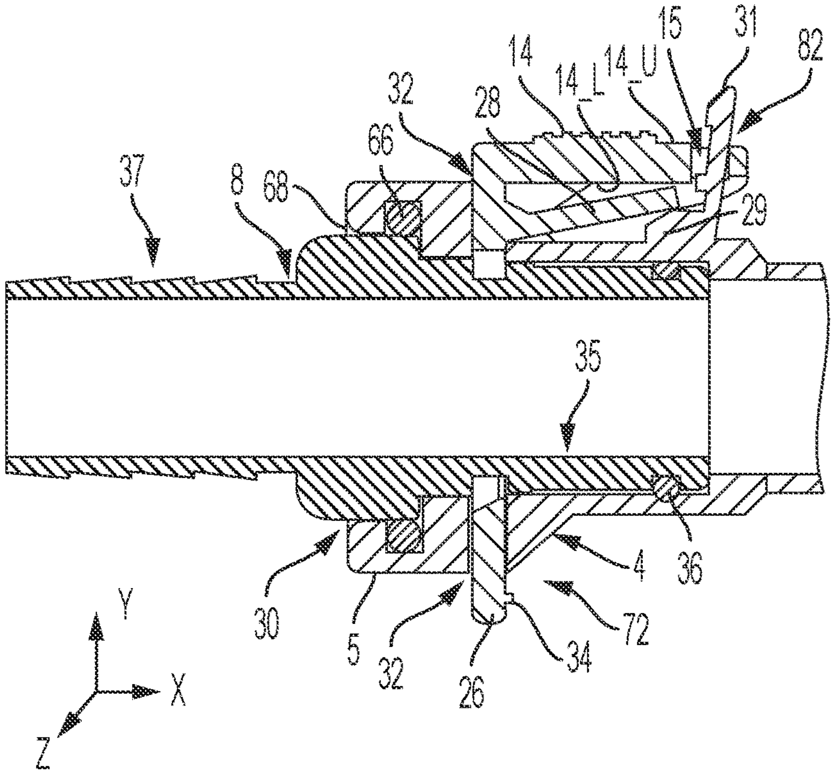
FIG. 8 is a cross-sectional side view of a nozzle interface of a marine pump with a detent locking arm in an unlocked position, a detent in a release position, and nozzle inserted.
Figure 9:
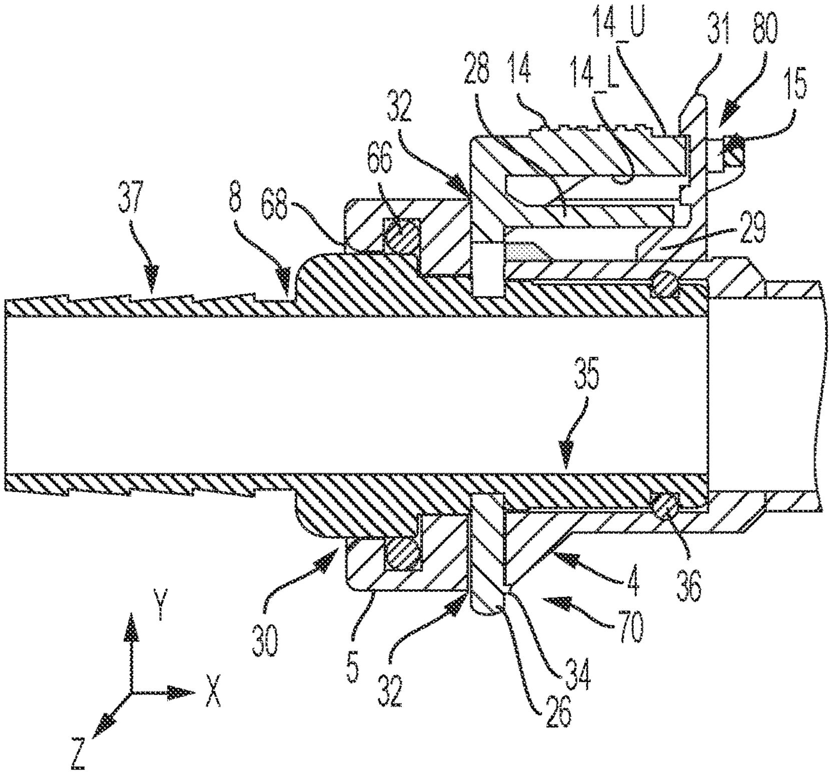
FIG. 9 is a cross-sectional side view of a nozzle interface of a marine pump with a detent locking arm in a locked position, a detent in a engaged position, and nozzle inserted.
Figure 10:
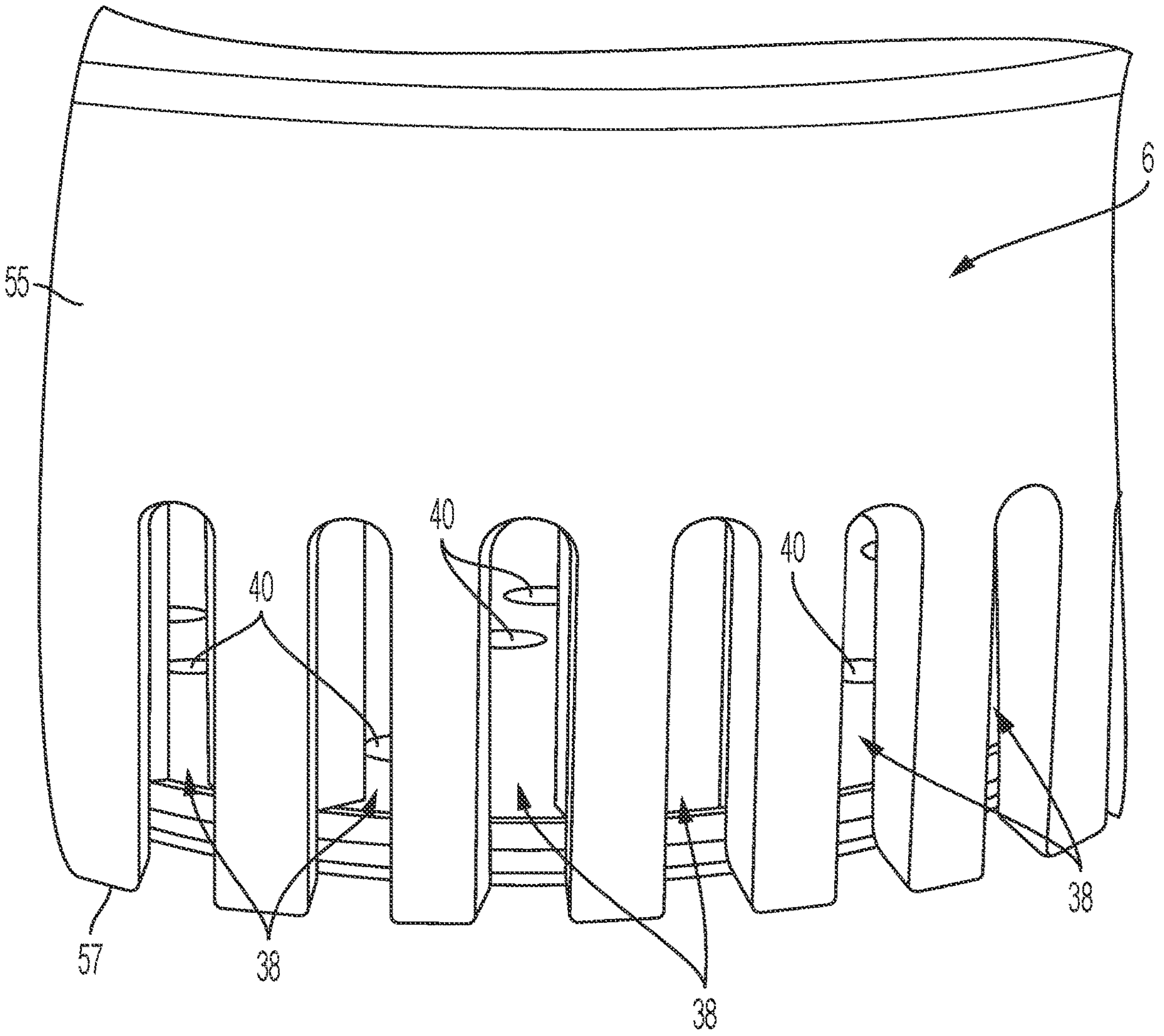
FIG. 10 is a side view of a strainer base of a marine pump.

Referring to FIGS. 6-9, another embodiment of the nozzle interface 4 is shown, details and/or differences being described below. In certain optional embodiments, the actuation surface 14 of the detent 26 may include an opening 15 configured to receive a detent locking arm 31 of the nozzle interface 4. The detent locking arm 31 may extend from the outer surface 5 of the nozzle interface 4. In certain optional embodiments, the detent locking arm 31 may include the protrusion 29, described above, or alternatively, may extend from said protrusion 29. In other optional embodiments, the detent locking arm 31 may be integrally formed with the nozzle interface 4. In further optional embodiments, the detent locking arm 31 may be configured to engage one or more of an upper surface 14_U or a lower surface 14_L of the actuation surface 14 when the detent locking arm 31 is in a locked position 80, as illustrated in FIG. 9. Neither the upper surface 14_U nor the lower surface 14_L are engaged by the detent locking arm 31 when in an unlocked position 82, as illustrated in FIGS. 6-8. The detent locking arm 31 may be biased towards the locked position 80.

As illustrated in FIGS. 6-9, the nozzle aperture 30 may include a first cylindrical portion 60 and a second cylindrical portion 62. The first cylindrical potion 60 may be closer to an outer opening 68 of the nozzle aperture 30 than the second cylindrical portion 62. The detent channel 32 may be defined along the second cylindrical potion 62. The first cylindrical portion 60 may have a circumference larger than that of the second cylindrical portion 62. The nozzle 8, or more specifically, the interface portion 35 of the nozzle 8 may include respective portions corresponding to the first and second cylindrical portions 60, 62. In certain optional embodiments, the nozzle aperture 30 may include a circumferential channel 64 configured to receive a gasket 66. The gasket 66 may be configured to create an improved seal between the nozzle 8 and the nozzle aperture 30 such that fluid does not leak when transferring from the pump housing 10 through the nozzle 8. In certain optional embodiments, the circumferential channel 64 and the gasket 66 may be positioned between the outer opening 68 and the second cylindrical portion 62 of the nozzle aperture 30. The gasket 36 of the nozzle 8 may be offset from the gasket 66 of the nozzle aperture 30. The gasket 36 may, for example, be configured to engage the first cylindrical portion 60.

As illustrated in FIG. 6, a user may apply pressure to the detent locking arm 31 in essentially the positive X-axis direction to move the detent locking arm 31 from a first position (e.g., the locked position 80) to a second position (e.g., the unlocked position 82). As illustrated in FIG. 7, a user may then apply pressure to the actuation surface 1 4 of the detent 26 in the negative Y-axis direction to move the detent 26 from the engaged position 70 to the release position 72. As illustrated in FIG. 8, the nozzle 8 may be inserted into the nozzle aperture 30 may moving the nozzle 8 in the positive X-axis direction. As illustrated in FIG. 9, the detent 26 may automatically return from the release position 72 to the engaged position 70 via the spring tab 28. Similarly, the detent locking arm 31 may automatically return from the unlocked position 82 to the locked position 80. Optionally, a positive Y-axis direction pressure may be applied to a lower portion of the detent 26 to aid in the movement from the release position 72 to the engaged position 70.

The strainer base 6 may be positioned on a bottom side of the marine pump 2 so that the marine pump 2 rests on the strainer base 6 and a bottom surface of the strainer base 6 is in contact with a surface on which the marine pump 2 is mounted. In certain optional embodiments, the strainer base 6 may include a surface profile shape configured to allow for mounting of the marine pump 2 on various surfaces, including uneven surfaces.

Referring to FIGS. 1, 10 and 16A-17E, various embodiments of the strainer base 6 are illustrated. The various embodiments of the strainer base 6 differ only in shape (e.g., for receiving different pump housing 10 sizes), and as such the following description is equally applicable to all of the shown embodiments. In certain optional embodiments, the strainer base 6 may include a strainer base arm 16 having an arm release surface 18 configured to contact an interior portion of a release aperture 20 of the pump housing 10, as illustrated in FIG. 1. The arm 16 and arm release surface 18 may be configured to move with respect to the release aperture 20 of the pump housing 10 when a pressure is applied to the arm release surface 18.

As illustrated in FIGS. 16A-17E, the strainer base 6 may further include a second strainer base arm 50 having a second arm release surface 52. The second strainer base arm 52 may be offset from the strainer base arm 16. For example, the second strainer base arm 52 may be positioned opposite from the strainer base arm 16. When both arms are included, the arm release surface 18 and the second arm release surface 52 may necessarily be engaged (e.g., having pressure applied), simultaneously, to be released from the pump housing 10.

In certain optional embodiments, the strainer base 6 may include a bottom surface 54 and a side surface 55. The plurality of holes 40 of the strainer base 6 may be positioned on, or define through, the bottom surface 54 of the strainer base 6. The plurality of slots 38 may be positioned on, or defined through, the side surface 55 of the strainer base 6. The bottom surface 54 of the strainer base 6 may be offset below a lower edge 57 of the side surface 55 of the strainer base 6. Such a configuration may permit fluid drawn through the strainer base 6 during pump operation to more completely pass through one or more holes 38 positioned on a bottom surface of the strainer base 6. In certain optional embodiments, the offset may be about 1 mm. In other optional embodiments, the offset may be between about 1 mm and 5 mm. In further optional embodiments, the offset may be less than or equal to about 10 mm. In certain optional embodiments, an interior surface 56 of the strainer base 6 may be offset above the lower edge 57 of the side surface 55 of the strainer base 6. In other optional embodiments, the plurality of slots 38 may be open to the lower edge 57. By varying dimensions of the bottom surface 54 and/or the offsets of the strainer base 6, flow rate of a fluid passing through the strainer 6 base may be sustained or even improved.

Figure 5A:
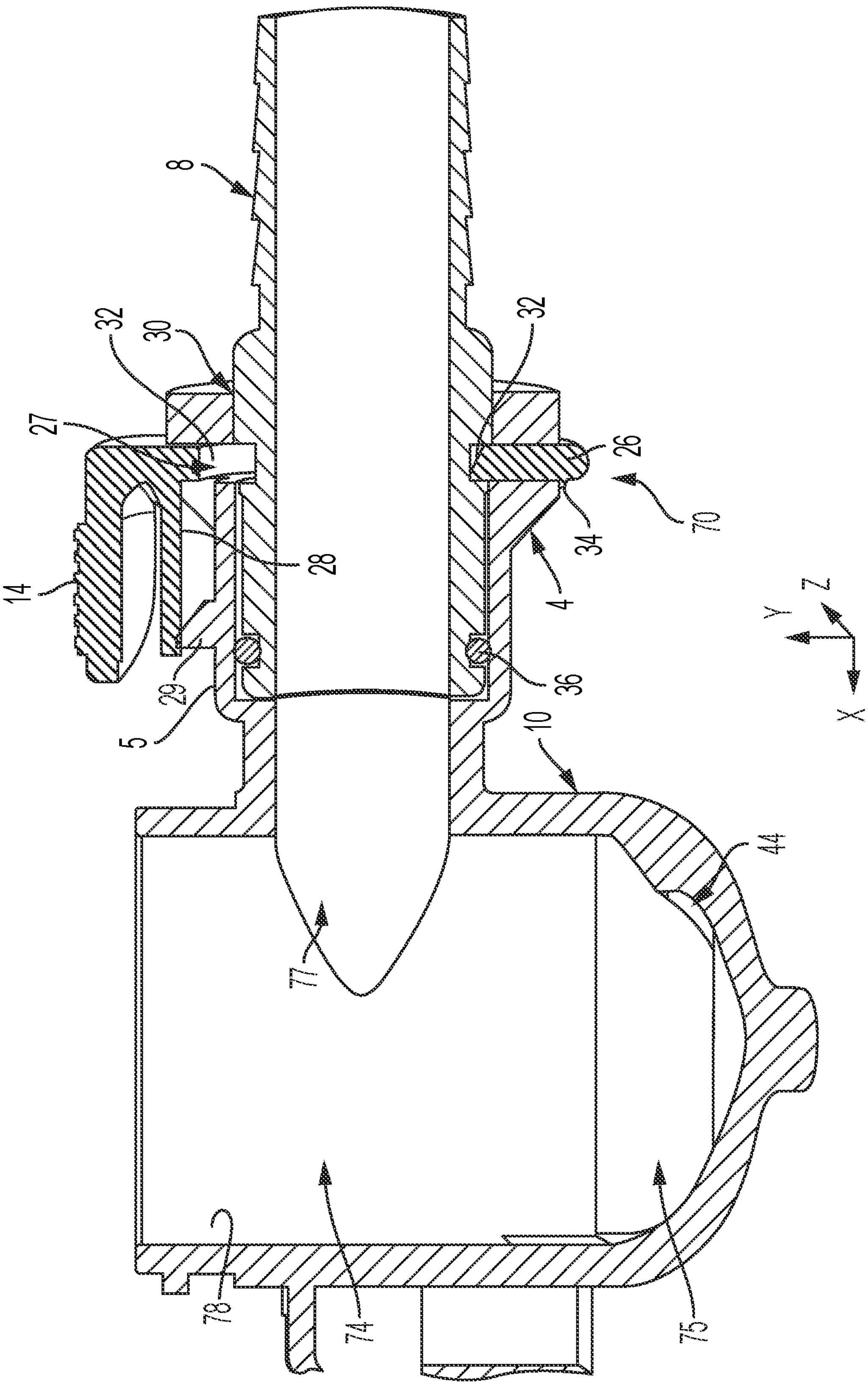
FIG. 5A is a cross-sectional side view of a nozzle interface of a marine pump taken along and in the direction of line 1-1 of FIG. 1, with nozzle inserted and an interior volume of the pump.
Figure 5B:
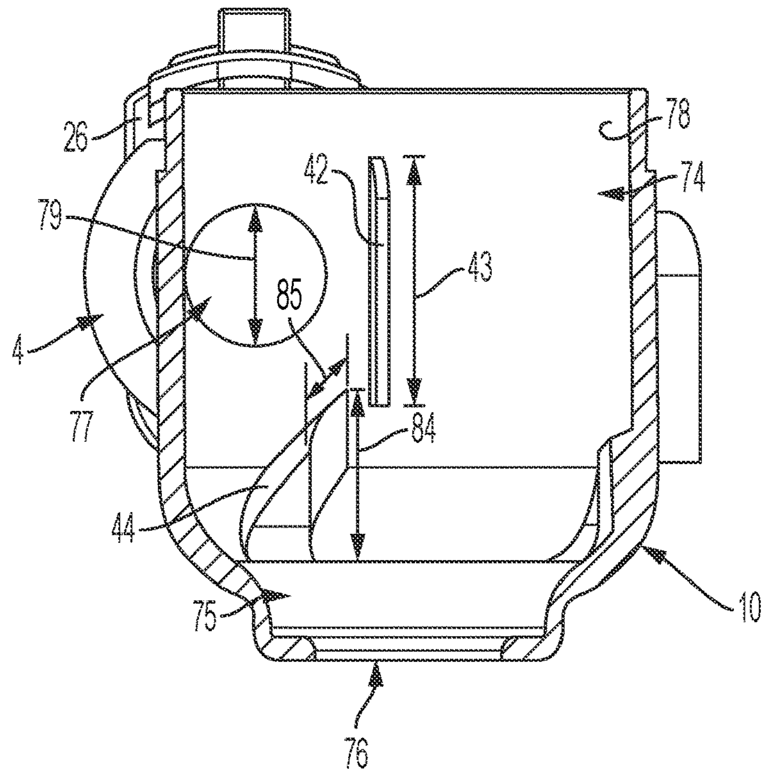
FIG. 5B is a cross-sectional side view of a nozzle interface of a marine pump.
Figure 5C:
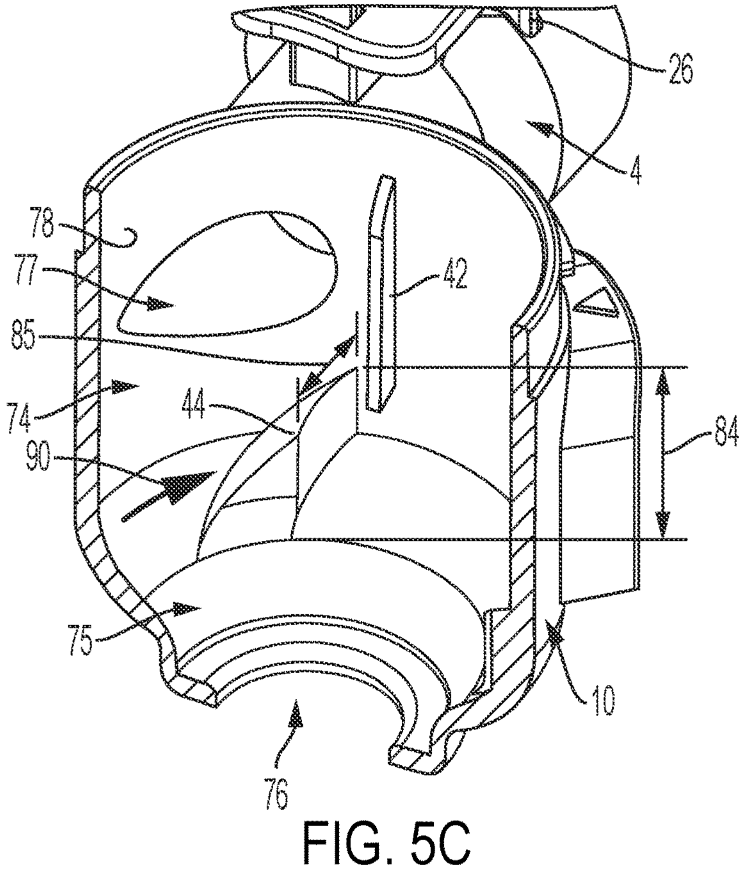
FIG. 5C is a cross-sectional perspective view of a nozzle interface of a marine pump.

Referring to FIGS. 5A-5C, the pump housing 10 may include an interior having a cylindrical interior upper portion 74 and a conical interior lower portion 75 with an intake opening 76 at its lowest point. The pump housing 10 may further include an output opening 77 defined in the cylindrical interior upper portion 74 leading to the nozzle interface 4.

Figure 11:
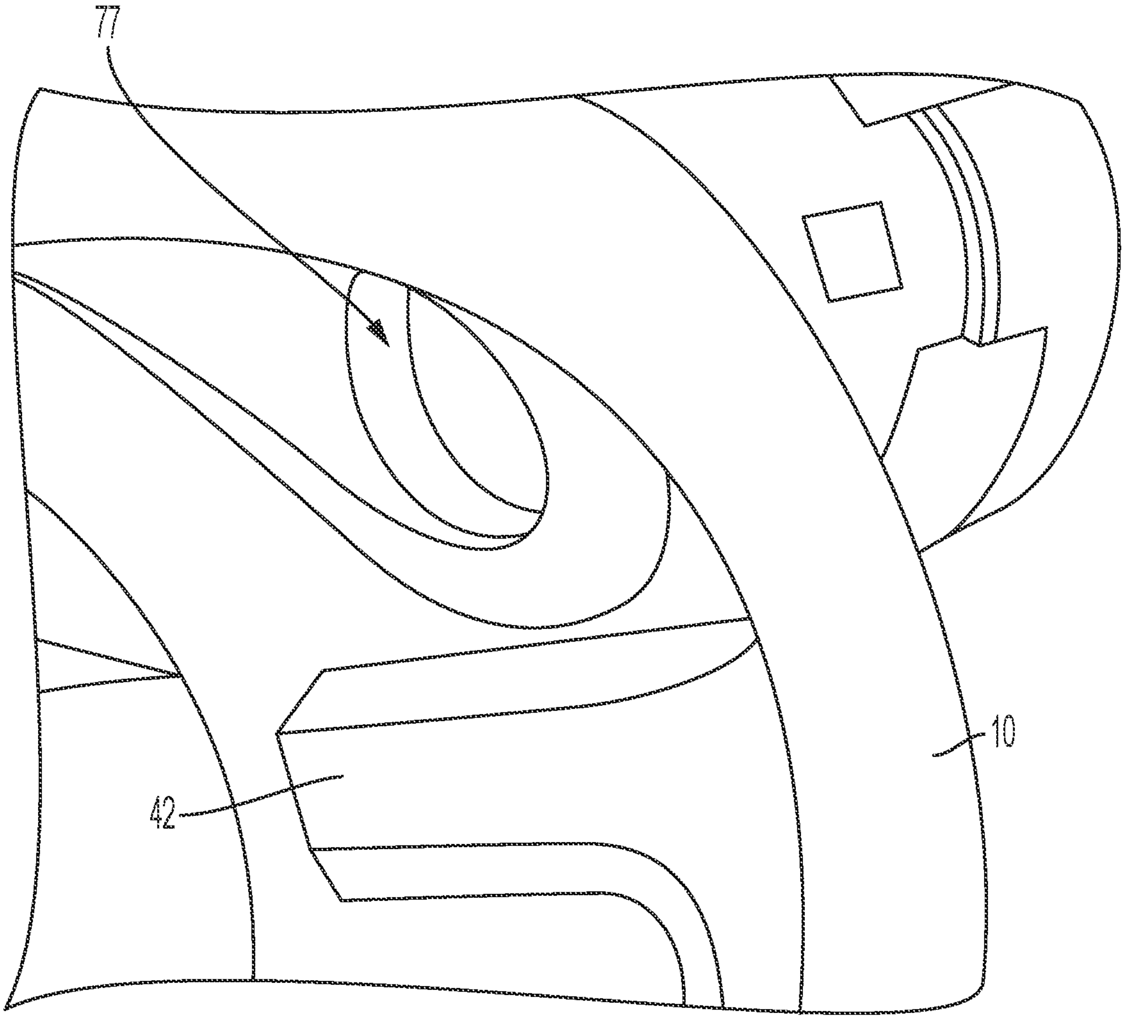
FIG. 11 is a three-dimensional interior view of a flow deflection plate of a marine pump.
Figure 12:
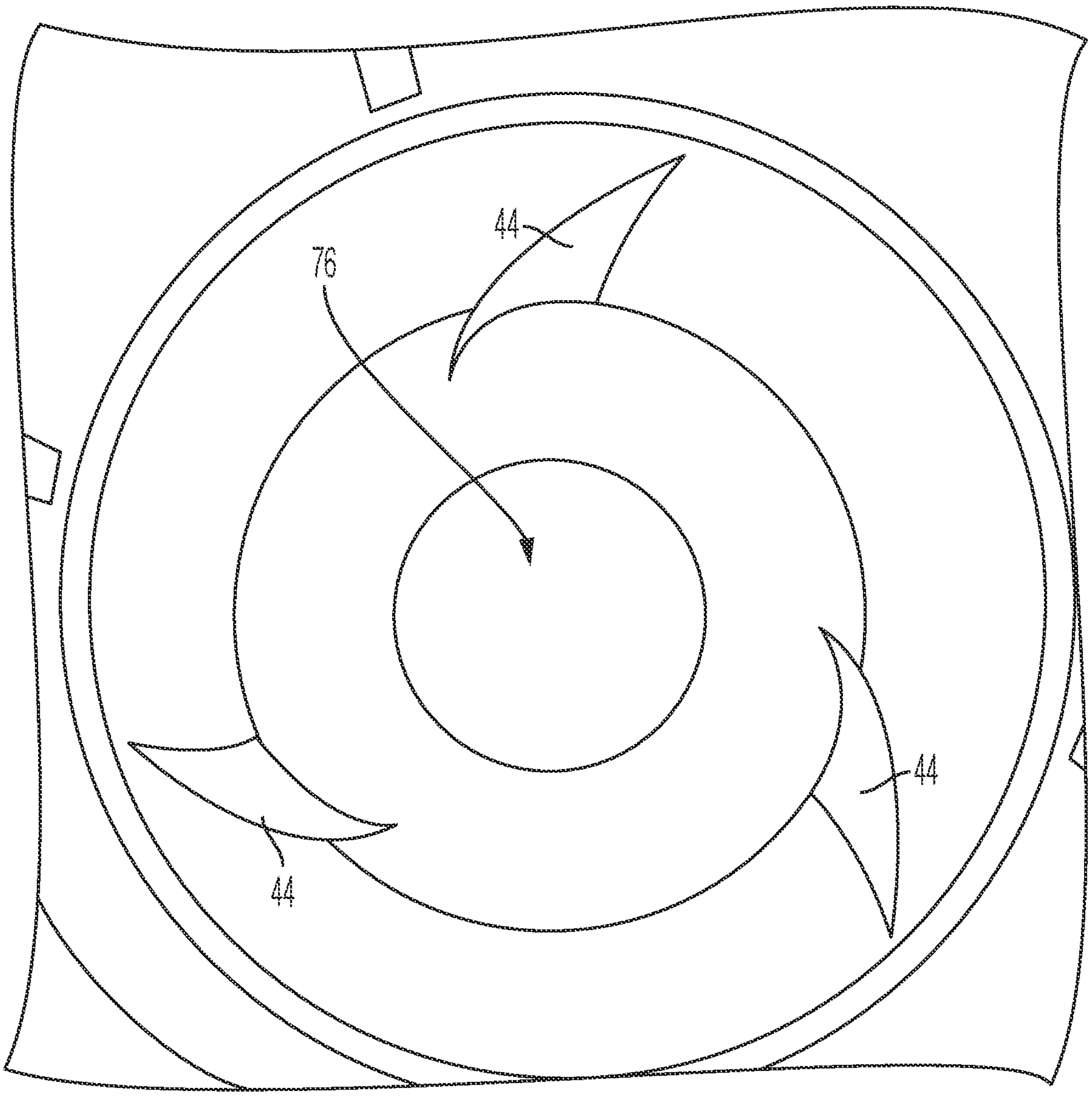
FIG. 12 is a view of turbulence reducing vanes of a pump housing of a marine pump.

Referring to FIGS. 5B-5C and 11, the marine pump 2 may further include a flow deflection plate 42 positioned within the pump housing 10. The flow deflection plate 42 may extend from an interior surface 78 of the pump housing 10 and be positioned, for example, within the cylindrical interior upper portion 74. The flow deflection plate 42 may be configured to redirect a fluid (indicated by the flow direction arrow 90) moving within the housing into the output opening 77 and out of the marine pump 2 via the nozzle interface 4. In certain optional embodiments, the flow deflection plate 42 may include a height 43 generally greater than or equal to a height 79 (or inner diameter) of the output opening 77 of the pump housing 10. In other optional embodiments, a midpoint of the height of the flow deflection plate 42 may be aligned with a midpoint of the height of the opening from the pump housing 10 to the nozzle interface 4. In further optional embodiments, the height 43 of the flow deflection plate 42 may be one-point-five times (1.5×) the height 79 of the output opening 77. In certain optional embodiments, the flow deflection plate 42 may be integrally formed with the pump body 10. In other optional embodiments, the flow deflection plate 42 may be coupled within the pump body 10. The flow deflection plate 42 may advantageously increase the efficiency of the marine pump 2 and reduce the outflow bypass.

Referring to FIGS. 5A-5C and 12, the marine pump 2 may further include turbulence reducing vanes 44 positioned within the pump housing 10. The turbulence reducing vanes 44 may extend from the interior surface 78 of the pump housing 10 and be positioned, for example, within one or more of the cylindrical interior upper portion 74 or the conical interior lower portion 75. The turbulence reducing vanes 44 may be ramp shaped along the flow direction 90 so as to help force a fluid moving within the pump from the intake opening 76 towards the output opening 77. In certain optional embodiments, each of the turbulence reducing vanes 44 may include a coupling height 84 extending (e.g., vertically) along the interior surface 78 of the pump housing 10. The coupling height 84 may be between about ten (10) millimeters (mm) and about thirty (30) mm. Alternatively, the coupling height 84 may be about twenty (20) mm plus or minus one (1) mm. In other optional embodiments, each of the turbulence reducing vanes 44 may include a width 85 extending from the interior surface 78 of the pump housing 10. The width 85 may be between about five (5) mm and about fifteen (15) mm. Alternatively, the width 85 may be about ten (10) mm plus or minus zero-point-two-five (0.25) mm. In further optional embodiments, an upper portion of the turbulence reducing vanes 44 may overlap with a lower portion of the flow deflection plate 42 with the upper portion being offset from the lower portion, respectively, along the interior surface 78 of the pump housing 10. In certain optional embodiments, the turbulence reducing vanes 44 may be integrally formed with the pump body 10. In other optional embodiments, the turbulence reducing vanes 44 may be coupled within the pump body 10. The turbulence reducing vanes 44 may be configured to help direct flow and reduce the turbulence inside the pump housing 10, especially during start up thereof.

Figure 13:
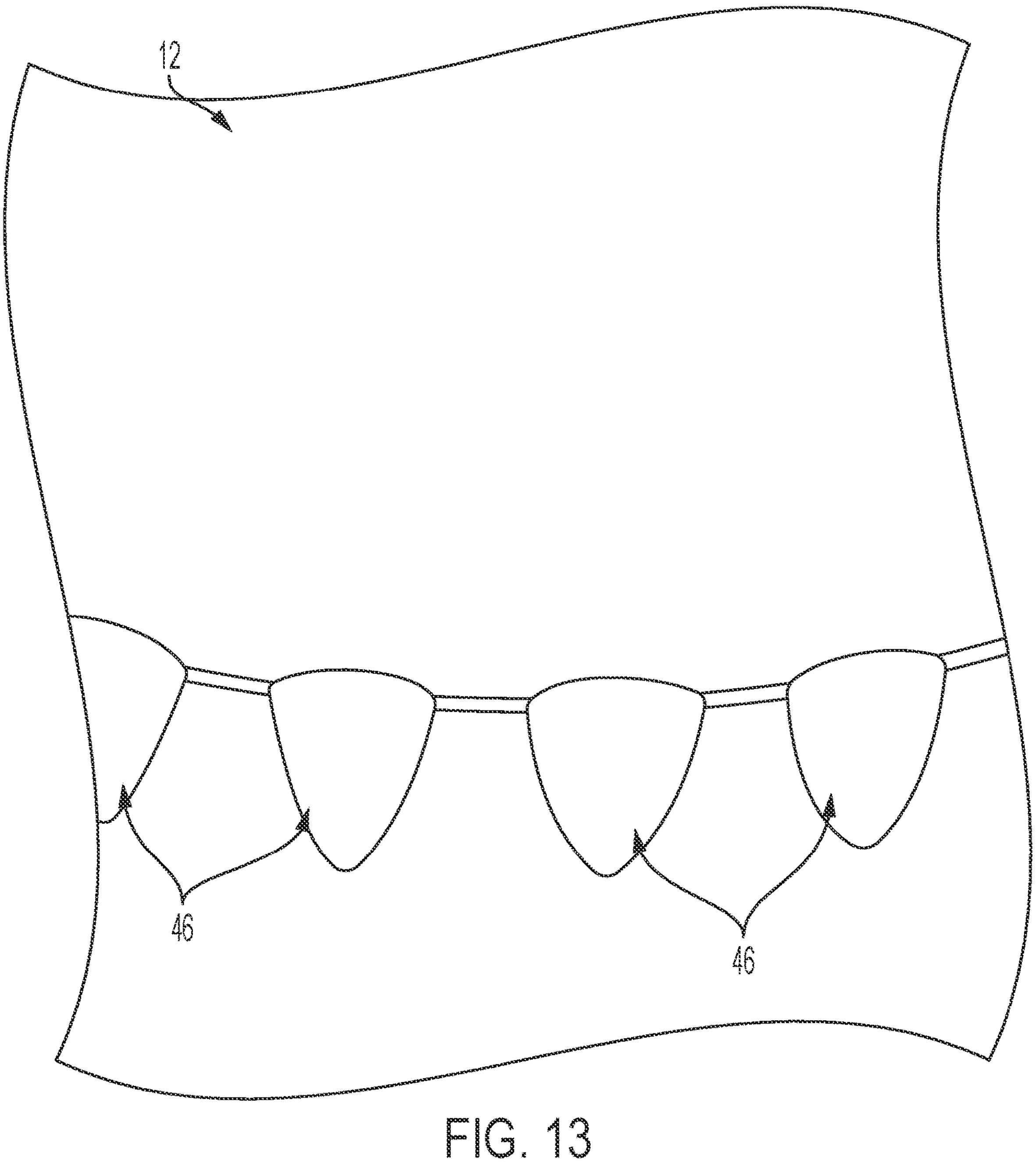
FIG. 13 is a three-dimensional perspective view of a pump cartridge of a marine pump.

Referring to FIGS. 1, 13, 14, and 15, the marine pump 2 may further include a pump cartridge 12. As illustrated in FIGS. 1 and 13, the pump cartridge 12 may include cartridge grip scallops 46 (e.g., notches) defined along a top edge of the pump cartridge 12. The cartridge grip scallops 46 may be provided as a user gripping surface to aid a user in gripping the pump cartridge 12, which may be configured to unscrew from the pump housing 10 to allow a user to access the pump motor for maintenance or repair.

Figure 14:
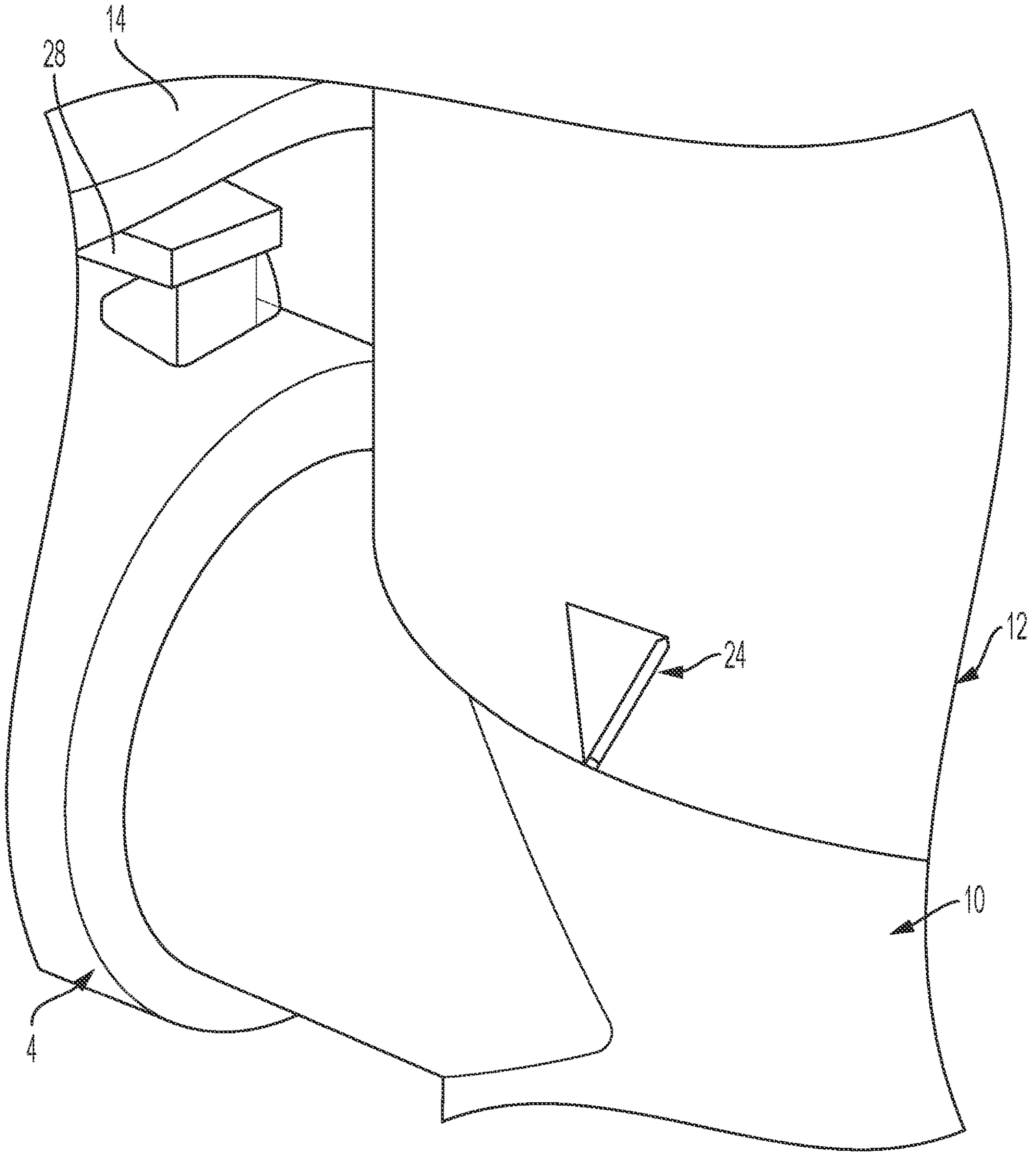
FIG. 14 is a three-dimensional perspective view of a surface of a pump cartridge of a marine pump having alignment arrows.

In certain optional embodiments, as illustrated in FIGS. 1 and 14, the pump cartridge 12 may include at least one alignment arrow 24 positioned along a bottom edge of the pump cartridge 12. The at least one alignment arrow 24 may aid a user in aligning the pump cartridge 12 during installation. In certain optional embodiments, the at least one alignment arrow 24 may comprise two alignment arrows. In other optional embodiments, the pump housing 10 may include at least one corresponding alignment arrow (not shown). The at least one alignment arrow 24 may comprise a 1.5 mm raised arrow, however, in other optional embodiments, the at least one alignment arrow 24 may have different dimensions.

Figure 15:
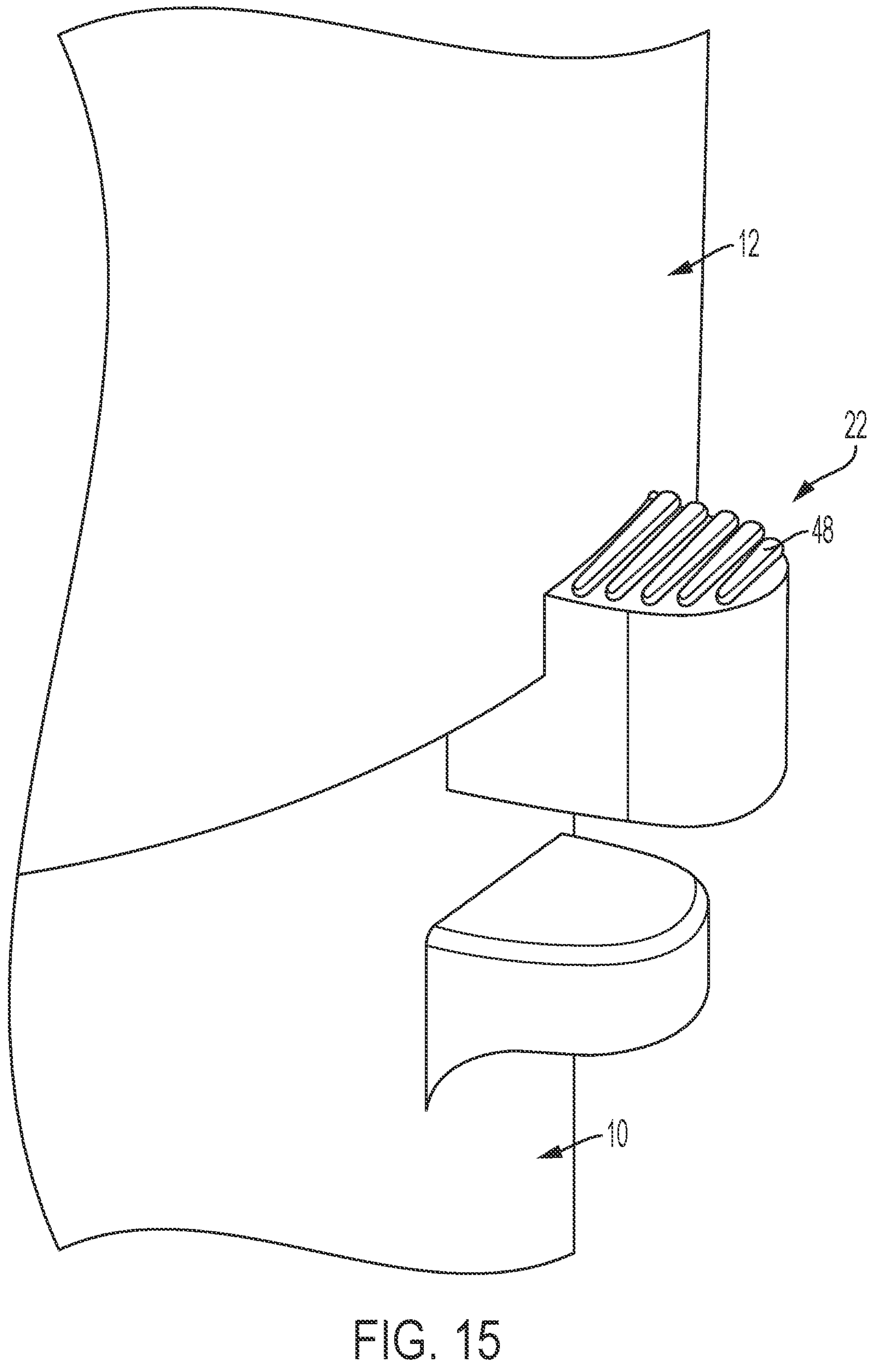
FIG. 15 is a three-dimensional perspective view of a locking button surface of a pump cartridge of a marine pump.
Figure 16A:
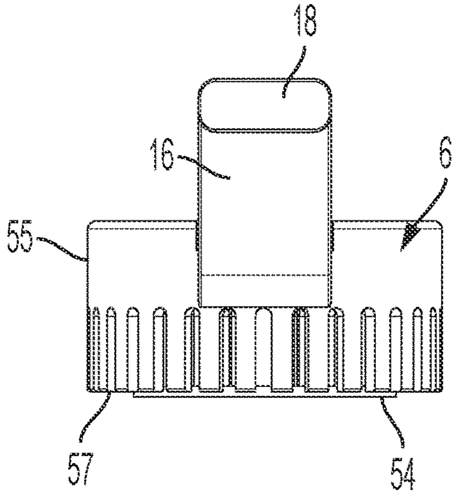
FIGS. 16A-D depict respective side, back, front, top and bottom views of a strainer base of a marine pump.
Figure 16B:
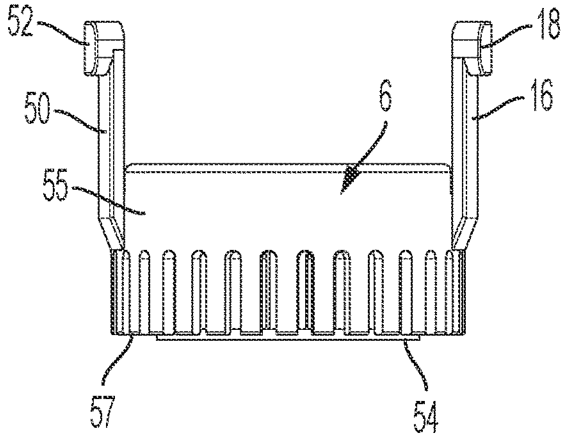
Figure 16C:
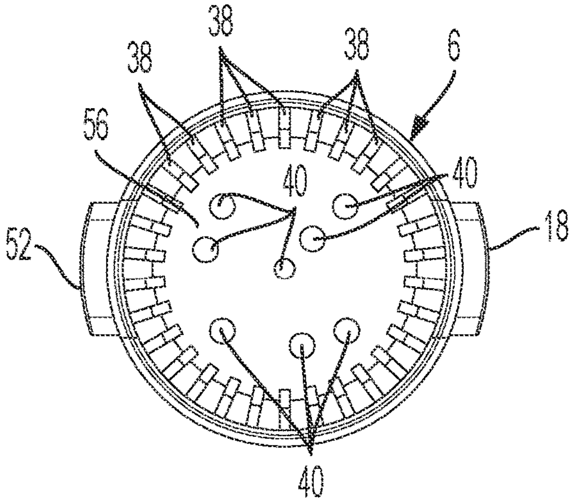
Figure 16D:
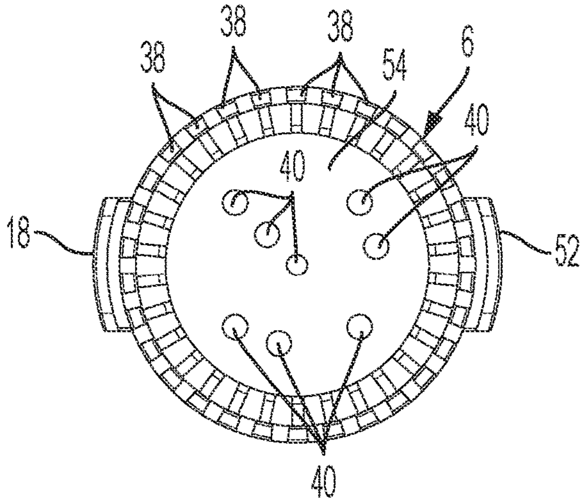
Figure 17A:
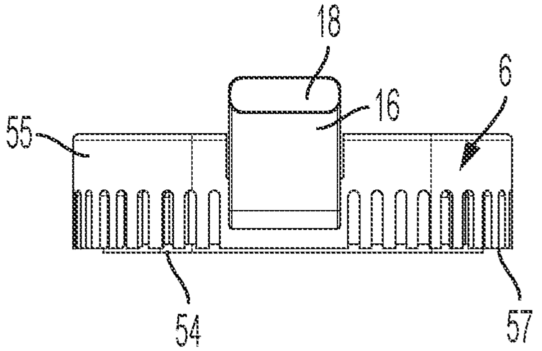
FIGS. 17A-E depict respective side, back, front, top and bottom views of an alternative embodiment of a strainer base of a marine pump.
Figure 17B:
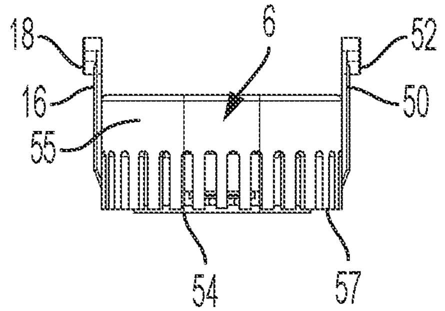
Figure 17C:
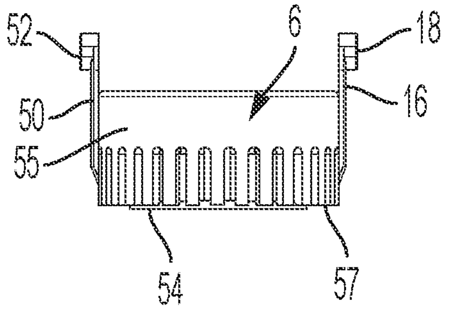
Figure 17D:
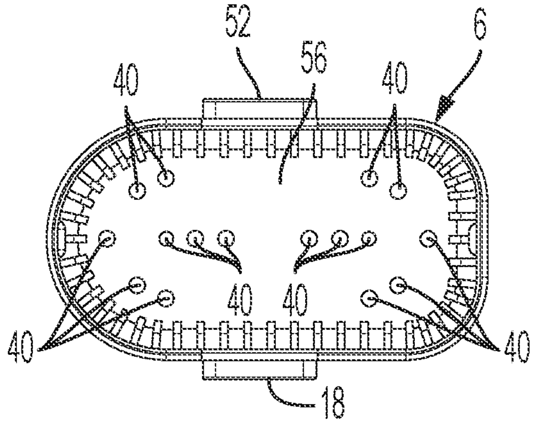
Figure 17E:
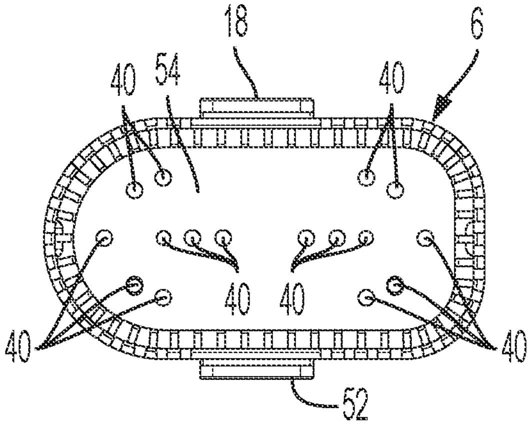

As illustrated in FIGS. 1 and 15, the marine pump 2 may further include a cartridge lock 22. The cartridge lock 22 may enable the pump cartridge 12 to be installed in two orientations for user convenience and improved cable management capabilities. The cartridge lock 22 may biased towards a locked position and may include a locking button surface 48 which is configured to be engaged for unlocking the pump cartridge 12 prior to removal of the pump cartridge 12.

Throughout the specification and claims, the following terms take at least the meanings explicitly associated herein, unless the context dictates otherwise. The meanings identified below do not necessarily limit the terms, but merely provide illustrative examples for the terms. The meaning of “a,” “an,” and “the” may include plural references, and the meaning of “in” may include “in” and “on.” The phrase “in one embodiment,” as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A marine pump, comprising: a nozzle interface comprising a nozzle aperture and a detent channel, wherein the detent channel is configured to selectively receive a portion of a detent; and a detachable strainer base, wherein the strainer base has a plurality of slots and a plurality of holes, each configured to interact with and stop particulates in a fluid passing through the strainer base; and wherein the detent comprises an actuation surface having an opening configured to receive a detent locking arm, and wherein the detent locking arm extend outwardly from the nozzle interface.

2. The marine pump of claim 1, wherein the nozzle aperture defines a cylindrical volume, and wherein the detent channel opens into the nozzle aperture.

3. The marine pump of claim 2, wherein the detent channel is a portion of circumference of nozzle aperture, and wherein a portion of the detent extends below an underside of nozzle aperture.

4. The marine pump of claim 1, wherein the detent has a circular aperture, and wherein a circumference of the circular aperture is at least as great as a circumference of the nozzle aperture.

5. The marine pump of claim 1, wherein the detent has a catch, and wherein the catch is in contact with an outer surface of the nozzle aperture when the detent is in a engaged position.

6. The marine pump of claim 1, wherein the detent comprises an actuation surface, and wherein the detent channel is configured to allow a circular aperture of the detent to move out of a surface area of the nozzle aperture when a release pressure is applied to the actuation surface, and wherein the detent channel is configured to allow a portion of the detent to move into the surface area of the nozzle aperture when the release pressure is removed.

7. The marine pump of claim 6, wherein the detent further comprises a spring tab positioned below the actuation surface, the spring tab configured to engage a protrusion of the nozzle interface for biasing the detent towards an engaged position.

8. The marine pump of claim 1, wherein the detent locking arm is configured to engage both an upper surface and a lower surface of the actuation surface when in a locked position.

9. The marine pump of claim 8, wherein the detent locking arm is biased towards the locked position.

10. The marine pump of claim 1, wherein the detent locking arm is integrally formed with the nozzle interface.

11. The marine pump of claim 1, wherein the strainer base comprises an arm having an arm release surface configured contact an interior portion of a release aperture of a pump housing of the marine pump when the strainer base is attached to the marine pump.

12. The marine pump of claim 11, wherein the arm release surface is configured to move with respect to the release aperture of the pump housing when a pressure is applied to the arm release surface.

13. The marine pump of claim 1, wherein the plurality of holes are positioned on a bottom surface of the strainer base.

14. The marine pump of claim 1, wherein the plurality of slots are positioned on a side surface of the strainer base.

15. The marine pump of claim 14, wherein a bottom surface of the strainer base is offset below the plurality of slots.

16. The marine pump of claim 1, wherein the nozzle aperture includes a circumferential channel configured to receive a gasket.

17. The marine pump of claim 16, wherein the circumferential channel is positioned between a distal opening of the nozzle aperture and the detent channel.

18. The marine pump of claim 1, wherein the nozzle aperture includes a first cylindrical portion and a second cylindrical portion, and wherein the first cylindrical portion has a circumference larger than that of the second cylindrical portion.

19. The marine pump of claim 18, wherein the detent channel intersects the second cylindrical portion.

* * * * *